Oct. 18, 1966     K. B. KAISER     3,279,034
INDEXABLE CUTTER BLADE
Filed Dec. 17, 1964     2 Sheets-Sheet 2
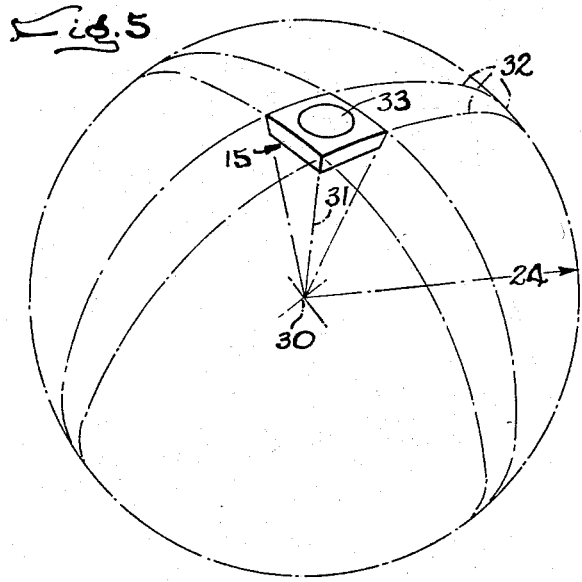
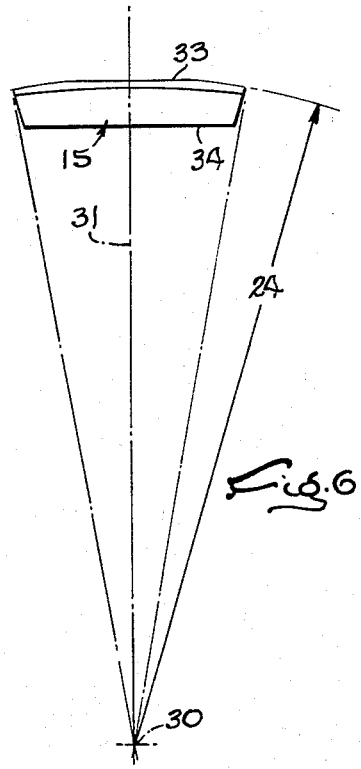
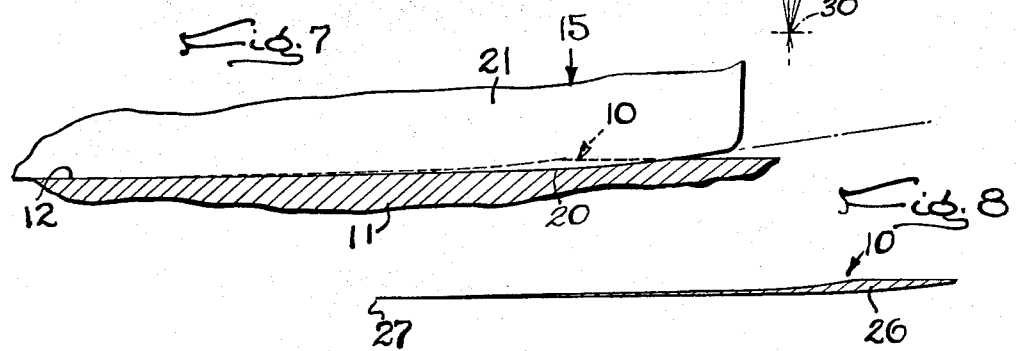
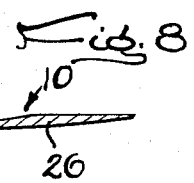
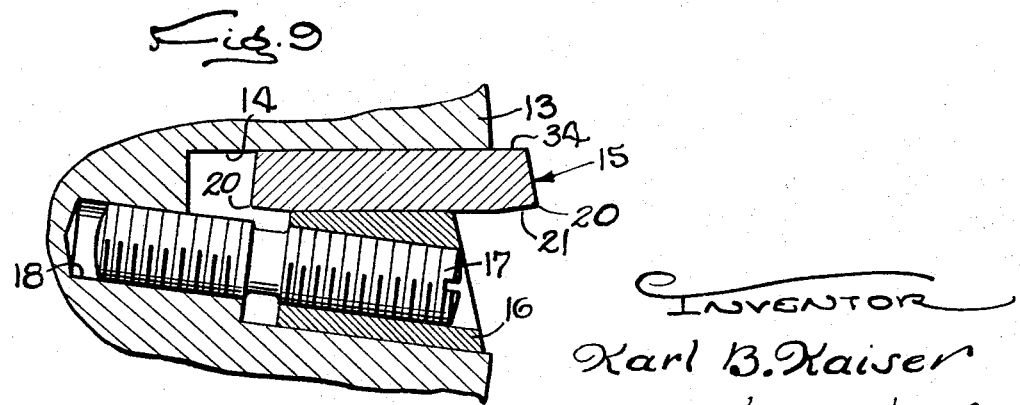
INVENTOR
Karl B. Kaiser
By Wolfe, Hubbard, Voit & Osann
ATTORNEY

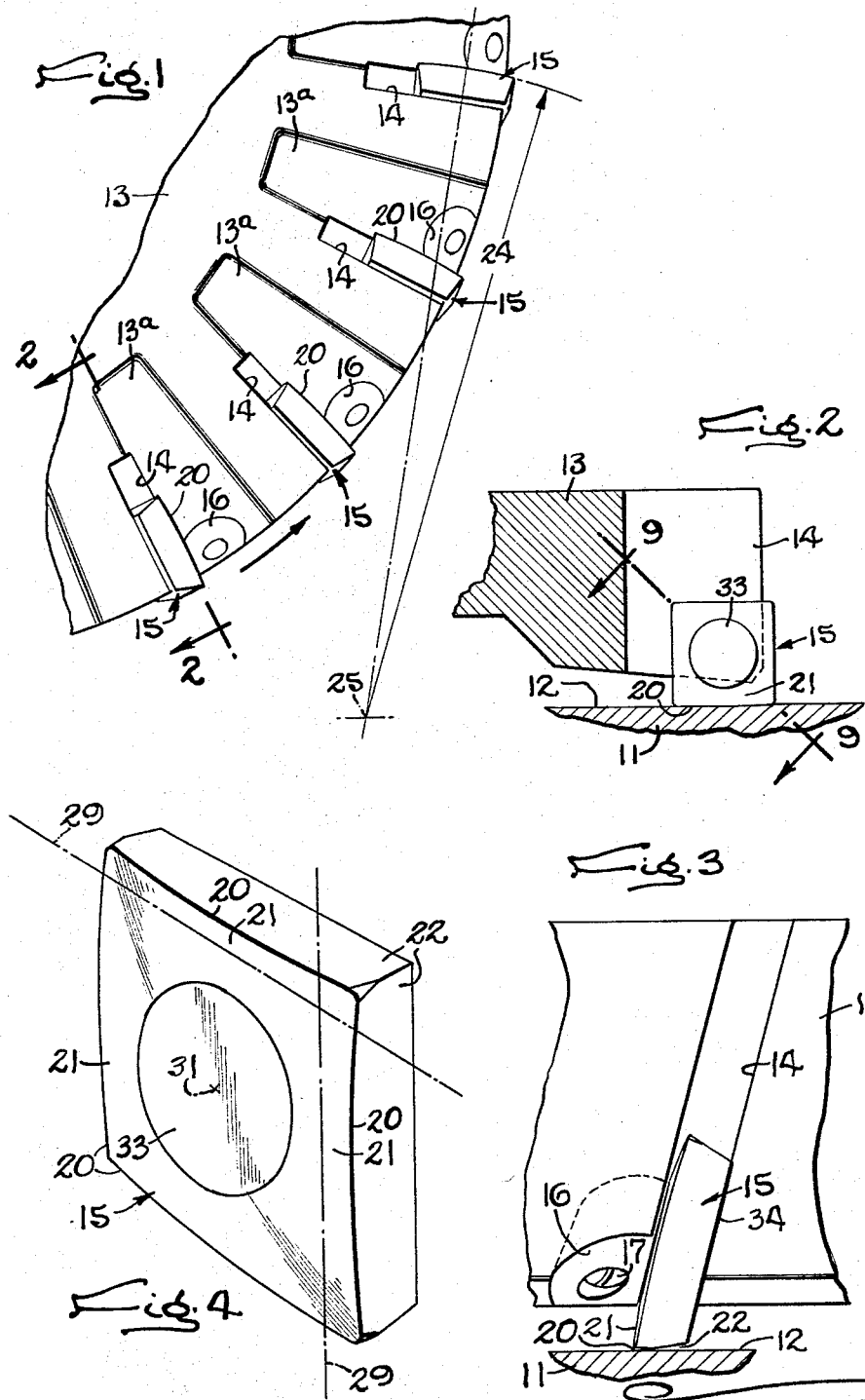

United States Patent Office 3,279,034
Patented Oct. 18, 1966

3,279,034
INDEXABLE CUTTER BLADE
Karl B. Kaiser, Rockford, Ill., assignor to The Ingersoll Milling Machine Company, Rockford, Ill., a corporation of Illinois
Filed Dec. 17, 1964, Ser. No. 419,066
5 Claims. (Cl. 29—95)

This invention relates to a blade for mounting in the body of an inserted blade cutter for use in finish milling, boring or turning and comprising a relatively flat wafer in the form of a polygon having cutting edges along the sides of the polygon with the cutting faces for each edge formed on one face of the wafer.

The primary object is to provide an indexable blade of the above character in which the several cutting edges are of equal lengths and comprise parts of extremely shallow ellipses by virtue of the cutting edges being defined by the intersection along one side edge of the polygonal wafer of a flat planar clearance face and an adjacent convexly curved cutting face of identical curvature.

A more detailed object is to impart the desired and identical curvature to each of the several cutting faces by forming the latter as different areas of a single sphere of substantially greater radius than the lengths of the cutting edges.

Other objects and advantages of the invention will become apparent from the following detailed description taken in connection with the accompanying drawings, in which FIGURE 1 is a fragmentary end view of a face milling cutter incorporating the improved indexable blade.

FIG. 2 is a fragmentary section taken along the line 2—2 of FIG. 1.

FIG. 3 is a side view of a portion of FIG. 1.

FIG. 4 is perspective view of the indexable blade constituting the present invention.

FIG. 5 is a perspective view of the blade showing the relation of its cutting faces to a sphere on which these faces lie.

FIG. 6 is a side view of the blade showing the relation between the cutting and clearance faces and the center of the sphere.

FIG. 7 is an enlarged fragmentary view of a blade face and work section illustrating the cutting action.

FIG. 8 is an enlarged cross-section of the chip removed by the blade.

FIG. 9 is a fragmentary section taken along the line 9—9 of FIG. 2.

For purposes of illustration, the improved indexable blade is shown in the drawings incorporated in a face milling cutter adapted by combined rotation and transaxial feed to remove a thin layer 10 of material from a workpiece 11 and form an extremely flat and smooth finished surface 12 thereon. The cutter comprises a generally cylindrical body 13 formed around its periphery with radially and axially opening slots 14 in which indexable blades 15 of the improved construction are clamped by wedges 16 actuated by screws 17 (FIG. 9). One end of each screw threads through the wedge while the other reversely threaded end threads into a hole 18 in the body at the inner end of the slot. The blade edges project beyond the end of the body immediately behind chip recesses 13ª.

Each blade comprises a generally flat wafer forming a polygon having peripheral edges of equal lengths, there being four such side edges in the present instance. Along each edge and at the front or leading face of the blade is a cutting edge 20 defined by the intersection of a convexly curved cutting face 21 on the leading or front face of the wafer and a flat and planar clearance face 22 along one side of the polygon. The radius 24 (FIG. 1) of each point on each curved cutting face 21 is of substantial length, for example 4 to 20 inches and the center 25 of curvature with the blade positioned properly in the cutter body is disposed outside of the body, this axis being parallel to the rotational axis of the cutter.

With the cutting and clearance faces 21 and 22 thus formed, it will be apparent that each cutting edge 20 constitutes part of the longer side (FIG. 7) of an extremely shallow ellipse so that, during the combined rotation and transaxial feed of the cutter body, the cutting edge moves broadwise through the work and removes a layer or chip 10 (FIGS. 7 and 8) which is of maximum thickness 26 at the outer end of the edge 20 and tapers so gradually to its inner edge 27 that the finished word surface 12 formed by the action of successive blades is reduced to the desired precise flatness. The length of the thickened portion 26 of the chip is determined by the feed per revolution of the cutter and the shallowness of the ellipse of intersection of the faces 21 and 22, the latter being determined by the length of the radius 24 of curvature of the cutting faces 21. As a result of the overlapping of the cuts taken by successive blades, the finished surface 12 is of greater flatness and smoothness than is possible with the stepped and flat finishing edges commonly employed in face milling cutters.

In accordance with the present invention, the cutting faces 21 of the several cutting edges 20 on each wafer are located in a novel relation such that all of the edges are of equal length and the cutting faces are of the same size and shape and of identical curvature in planes 29 (FIG. 4) paralleling the cutting edges and perpendicular to the plane of the wafer. While faces of such curvature may be parts of cylinders, cones, or ellipsoids, they constitute surface areas of a single sphere 28 (FIG. 5) in the present instance and thus have a common center 30 of curvature and equal radii 24 of curvature. The latter is several times the length of the cutting edges 20 so as to impart the desired shallowness to the ellipses of intersection between the cutting faces and clearance faces 22 which are disposed equidistantly from the center 31 of the equilateral polygon which is formed by slightly curved cutting edges 20 and which is disposed between the planes of the front and back faces of the wafer. With the cutting and clearance faces thus constructed and arranged, the cutting edges are of equal lengths and intersect each other at the corners of the wafer. Since the cutting faces 21 all lie on a common sphere, they form a continuous surface around the entire margin of the front face of the wafer as shown in FIG. 4.

Conversion of a relatively flat wafer of cutting material and of the desired polygonal shape into the improved indexable blade may be effected by preforming the wafer to the desired contour or, as in the present instance, surface grinding one face of a thin and flat wafer of cutting material to remove metal from the outer margins thereof and form the cutting faces 21 to the desired radial width. This leaves the central part of the wafer face flat as indicated at 33 thus providing an area for effective engagement by the flat side of the wedge 16 and secure clamping of the blade in the body slot with the flat back face 34 lying against one wall of a body slot 14. Then, the clearance faces 22 are ground along each side of the polygon to form the final cutting edges 20 with the latter located equidistantly from the center of the blade.

For service use in finish face milling, the blades 15 are positioned and clamped in the cutter body with the one cutting edge 20 of each blade projecting from the end of the cutter body and the centers of all of the edges disposed in a common plane. Then, during rotation and transaxial feeding of the cutter at a feed rate per revolution substantially less than the radial lengths of the cutting edges, a layer of metal will be removed and an accurately finished surface 12 will be formed on the workpiece.

I claim as my invention:

1. An indexable cutter blade comprising a substantially flat wafer having a substantially flat back and a front face terminating at its periphery in a plurality of equal angularly spaced peripheral cutting edges composed of cutting material and joined at their adjacent ends to form a substantially equilateral polygon, each of said cutting edges being defined by a planar clearance face along one side of the polygon and a cutting face on one face of said wafer, all of said cutting faces constituting different areas of a common sphere and each intersecting the corresponding clearance face to constitute each of said cutting edges part of the longer side of a shallow ellipse.

2. An indexable cutter blade as defined in claim 1 in which all of said cutting faces constitute different areas of the surface of a common sphere and each of said spherical cutting faces intersects the corresponding clearance face to constitute each of said cutting edges part of the longer side of a shallow ellipse.

3. A cutter blade as defined in claim 1 in which a central area on the face of said wafer within said cutting faces is substantially flat and parallel to said back and intersects the cutting faces to define a circle.

4. An indexable cutter blade comprising a substantially flat wafer in the form of a polygon having a substantially flat back and a front face terminating around its periphery in a plurality of equal angularly spaced peripheral cutting edges of equal lengths composed of cutting material and defining an equilateral polygon disposed between and spaced from the planes of said back and front faces, clearance faces along the sides of the polygon, and cutting faces along the adjacent margins of said front face intersecting the clearance faces to define said cutting edges, said clearance faces being flat, straight, of equal lengths and equidistantly spaced from the center of the polygon, and said cutting faces being of identical size, shape and convex contour with radii of curvature several times the length of said cutting edges so that said cutting edges are of identical curvature and each constitutes the longer side of a shallow ellipse.

5. An indexable cutter blade as defined in claim 4 in which all of said cutting faces have a common center of curvature.

No references cited.

WILLIAM W. DYER, JR., *Primary Examiner.*

HARRISON L. HINSON, *Examiner.*